United States Patent [19]
Riehle

[11] 3,916,162
[45] Oct. 28, 1975

[54] SLIDE RULE

[76] Inventor: Harald Riehle, Anna-Schieber-Weg 8, 7300 Esslingen, Germany

[22] Filed: Nov. 5, 1974

[21] Appl. No.: 520,921

[30] Foreign Application Priority Data
Nov. 22, 1973 Germany............................ 2358259

[52] U.S. Cl. ............................... 235/70 R; 235/89 R
[51] Int. Cl.² ............................................ G06G 1/02
[58] Field of Search........................... 235/70, 85, 89

[56] References Cited
UNITED STATES PATENTS

| | | | |
|---|---|---|---|
| 2,323,475 | 7/1943 | Lang.................................... | 235/70 R |
| 2,454,157 | 11/1948 | Goldfien ............................ | 235/70 R |
| 2,530,047 | 11/1950 | Dewar................................. | 235/70 R |
| 2,746,682 | 5/1956 | Zak..................................... | 235/70 R |
| 2,815,172 | 12/1957 | Van Arsdale et al. ............ | 235/70 R |
| 3,301,480 | 1/1967 | Muller................................. | 235/70 R |

Primary Examiner—Lawrence R. Franklin
Attorney, Agent, or Firm—William R. Woodward

[57] ABSTRACT

A frame for the slide rule is composed of two longitudinal members of identical shape fitting and locking together when one is assembled to the other with a relative 180° difference in orientation. A slider is mounted in each frame member, after which a scale plate is mounted in each frame member with one edge in a groove and the other edge against a shoulder of the same frame member, after which the two frame members are fitted and locked together. In this condition, a spacing bridge spaces the scale plates apart to provide a guideway for the slide rule tongue which may then be inserted. The markings on the tongue are read through windows in the scale plates. The locking of the frame members together is provided by interfitting the studs.

13 Claims, 6 Drawing Figures

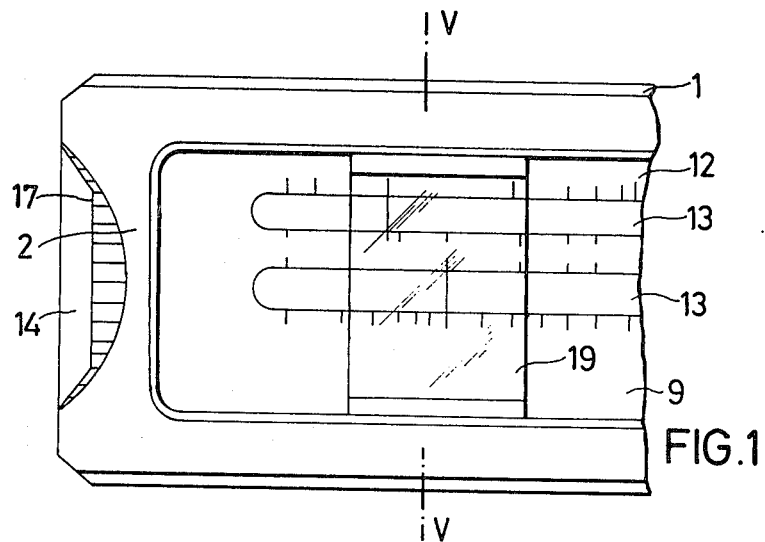
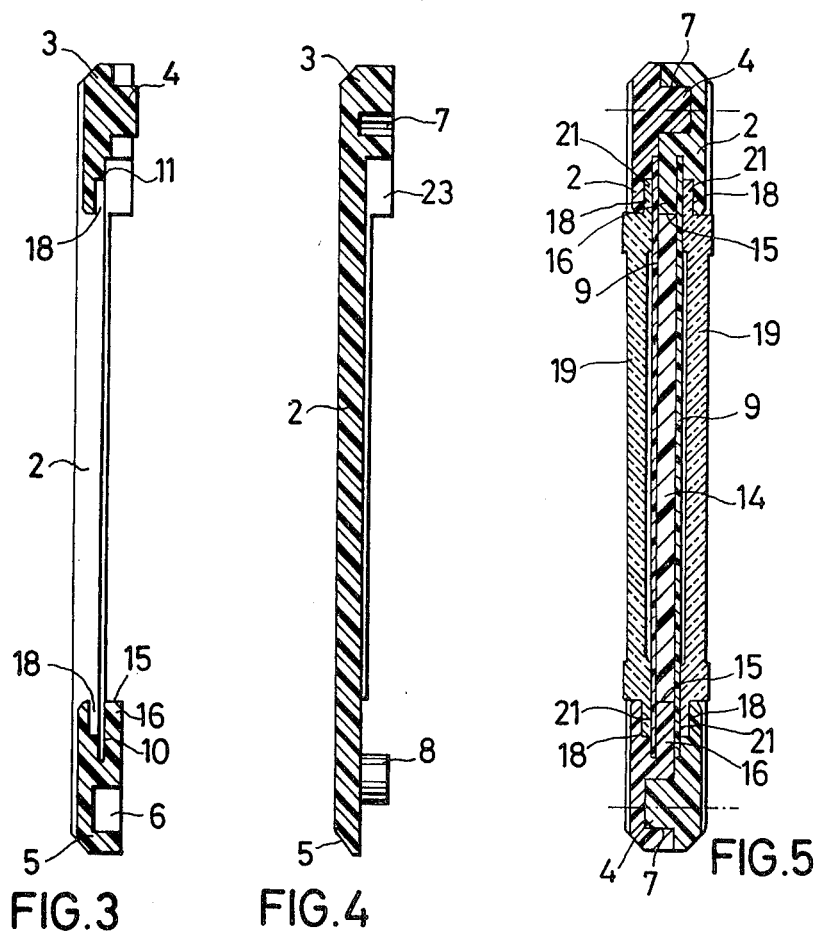

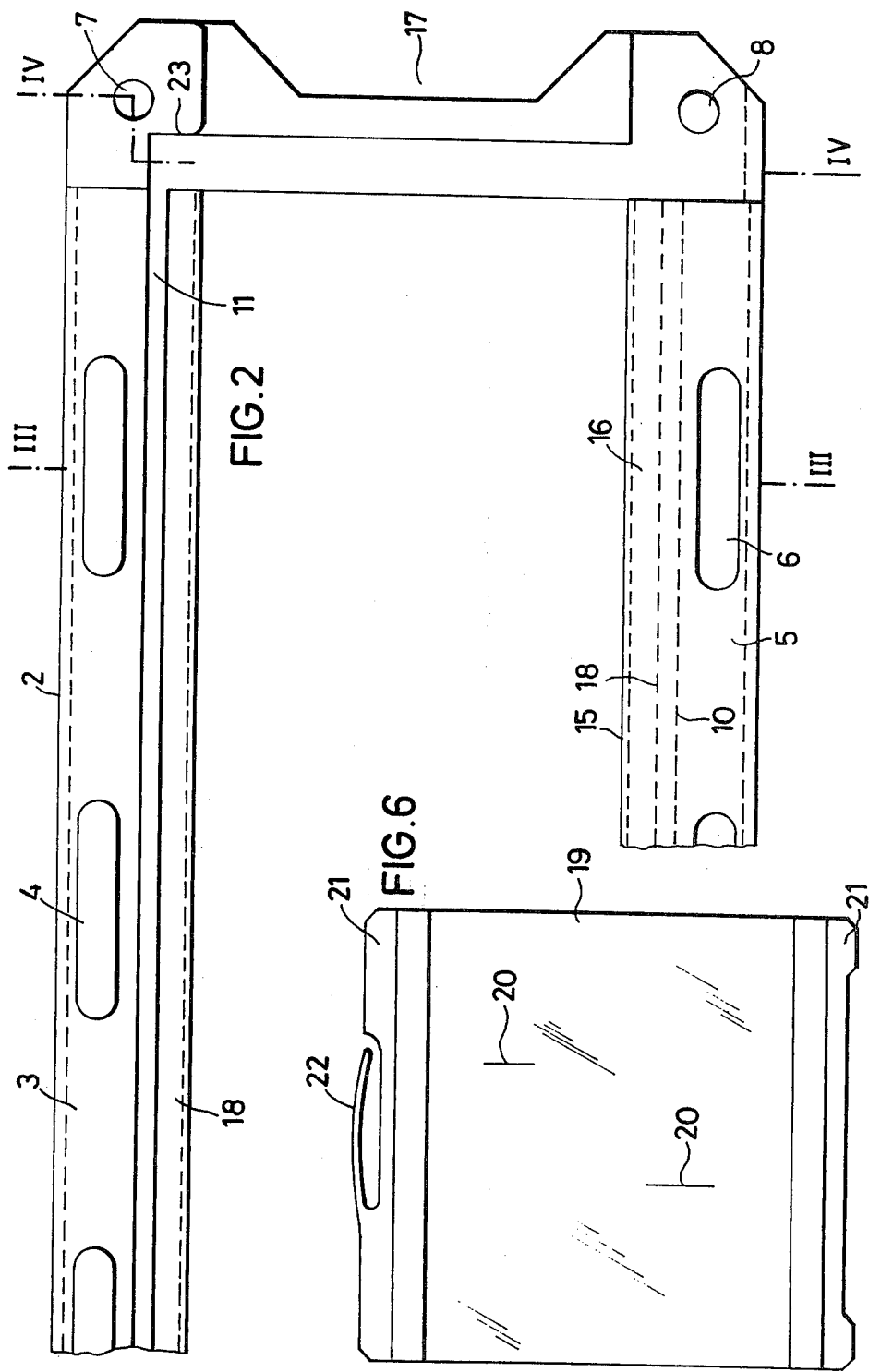

SLIDE RULE

This invention relates to a slide rule and, in particular, to a construction of a slide rule having a closed frame made up of two interfitting parts that can be permanently assembled without the use of an adhesive. The invention is especially useful in a rule provided with scales on both sides of the slide rule and arranged for reading the markings on the tongue through windows in the fixed scale plates.

Known types of slide rules include those with scale plates made of a flexible material, which may be of paper base material, or the like, on opposite sides of an intermediate strip, the structure being held together by rivets or adhesive. The opaque scale plates are provided with window-like openings which permit a view of the underlying scales or marks of a sliding tongue. Such slide rules can fulfill only limited accuracy requirements, and even at that, manufacture of such structures is not altogether simple, because the body of the rule is made of four parts, to wit, the two scale plates and two intermediate strips between them.

Slide rules are also known having scale plates of synthetic resin plastic material, in which case the scale plates are provided with an opaque layer on the inner side leaving only window-like openings that again allow the underlying marks or scales of the slide rule tongue to be observed. In such rules not only the scale plates, but also the shell formed of the sidewalls may be made of synthetic resin, in such a way that the scale plates are joined together by means of parts shaped corresponding to the narrow sides of the shell. Such slide rules are relatively expensive to produce and, even with them, the accuracy obtainable is limited by the requirements of construction.

It is an object of the present invention to provide a slide rule of simple construction that may be easily assembled and, nevertheless, provides high accuracy.

SUBJECT MATTER OF THE PRESENT INVENTION

Briefly, a slide rule frame is made by assembling two interfitting longitudinal members providing a guideway for the slide rule tongue and shaped for holding fixed scale members by their longitudinal edges in positions in which they will be separated by the tongue, the frame also providing a guideway for at least one transparent slider or runner. The tongue and the scale plates carry scales or other reference marks and the slider, of which there may be more than one, preferably one on each side of the rule, also carries at least one mark.

In a particularly advantageous form of the invention the two members that make up the frame are identically shaped and are put together with a 180° difference in their respective orientations, being held together by mortise and tenon joints, which is to say by studs fitting into cavities, preferably locked by snap action provided by the resilience of the material. Typically, each of the frame members is provided with projections (mortise elements) in the neighborhood of one longitudinal edge of the member and correspondingly shaped cavities (tenon elements) in the neighborhood of the other longitudinal edge. The scale plates are fixedly located, one in each frame member, and are separated by the slidable tongue. Guide grooves for the slider or sliders are provided externally of each scale plate in the frame member and, preferably, one side of each guide groove is confined by a surface of one of the scale plates.

The frame goes completely around the fixed part of the rule and holds the two scale plates at their edges.

In assembling the slide rule of the present invention, the two scale plates are respectively seated in two separate frame members, after which the frame members can be simply connected to each other. An effective and trouble-free holding of the spaced scale plates is thus provided and the sturdy frame thereby provides an accurate guideway for the slidable tongue.

Providing the frame members in identical form is of advantage for economy of manufacture and, in order to provide a firm structure and a permanent proper alignment, it is desirable that the frame members should interfit and should lock together. As already mentioned, that is preferably accomplished by the provision of mortise and tenon joints. The projections and cavities that make these joints are preferably elongated in the longitudinal direction of the slide rule, so that the regions in which the two frame members are locked together extend over a relatively great length.

In order to allow the sliders or runners to move easily, while at the same time preventing canting of the slider, it is desirable that the slider should have a spring bias device on at least one of its groove-fitting end portions, so as to support the slider on the bottom of the adjacent guide groove and fit it snugly in its grooves.

The invention is further described by way of example with reference to the accompanying drawings, in which:

FIG. 1 is a plan view of one end of a slide rule according to the invention;

FIG. 2 is a plan view, on a larger scale than FIG. 1, of one end of one frame member of the slide rule of FIG. 1;

FIG. 3 is a cross-section of the frame member of FIG. 2 along the line III—III of FIG. 2;

FIG. 4 is a cross-section of the frame member of FIG. 2 along the line IV—IV of FIG. 2;

FIG. 5 is a cross-section of the complete slide rule of FIG. 1 along the line V—V, on a different scale, and FIG. 6 is a plan view of a slider of the slide rule of FIG. 1, on a different scale.

The slide rule of which one end is illustrated in FIG. 1 is provided with a surrounding closed frame 1 having enough stiffness to hold a fixed shape. It is manufactured by synthetic resin plastic material, as are also the other parts of the slide rule. The frame 1 is divided along its length and consists of two frame members 2 of identical shape, one of which is illustrated in FIGS. 2–4. One of the frame members has its orientation displaced by 180° rotation relative to the orientation of the other when the two are in assembled position.

The two frame members fit each other so as to lock together with the assistance of projections of each member engaging cavities in the other, these features thus being a form of mortise and tenon joint. Each frame member 2 carries inwardly projecting elongated studs 4 formed integral therewith along one longitudinal side 3 of the frame and carries on the other longitudinal side 5 corresponding elongated holes or cavities 6. In addition, in the region of the corners of the frame, cylindrical studs 8 are provided in the extension of the lower longitudinal portion 5, corresponding to which cylindrical holes or cavities 7 are provided in a corresponding extension of the upper longitudinal portion 3.

The studs or tenons 4 and 8 and the corresponding mortise holes or cavities 6 and 7 are so formed that the studs catch in the holes or cavities when the two members are assembled with each other, so that the use of an adhesive for connecting the two frame members 2 can be dispensed with. Other forms of construction may be used, however, in which an adhesive is additionally provided for further stabilization of the junction of the two frame members to a single unit. In every case, however, the tenon studs 4 and 8 and the mortise holes or cavities 6 and 7 provide a correctly aligned and trouble-free relative mounting of the two frame members 2.

A scale plate 9 is held in each frame member 2 in the space between its opposite longitudinal framing portions. As shown in FIGS. 3 and 5, each frame portion for this purpose has a holding groove 10 on one longitudinal side and a supporting shoulder 11 on the other. The scale plate 9, therefore, needs merely to have one longitudinal edge inserted in the holding groove 10 while the other is put against the shoulder 11, in order to seat it exactly in the correct position with reference to the frame member 2.

The scale plates 9, as shown in FIG. 1, carry scales and marks as indicated at 12. Whether these marks are strictly scales or some other kind of indication of data, such as data derived from a table, the marks may be referred generally as reference marks.

The scale plates are opaque except for window-like openings 13, which may be provided, in the case of manufacture from inherently transparent synthetic resin material, by applying a suitable printed or coated film on the rear side of the scale plate. It is possible also, however, to provide a slide rule in which the scale plates are fully transparent. If the scale plates are made of opaque material, the windows 13 may be provided by openings in the scale plates whereas if they are of transparent, the window-like openings 13 are merely in the opaque layer at the back.

Between the plates 9 respectively held by the two frame members 2, there is slidably mounted a slide rule tongue 14 guided between the scale plates that is likewise provided with scales or other reference marks, the latter being visible through the window-like openings 13 of the scale plates 9.

A guideway for the tongue 14 is provided in the frame 1 made up of the frame members 2, this guideway being formed by two opposite longitudinal surfaces 15, each of which is provided on one side of one of the frame members 2, as may be observed in FIGS. 2 and 5. Since the two frame members 2 are disposed with one having its orientation rotated by 180° with respect to the orientation of the other, each of the holding grooves 10 for a scale plate 9, one of which is provided by each of the frame members 2, always comes to be located opposite a supporting shoulder 11, so that a limiting spacer portion 16 along side the guiding surface 15 limiting a holding groove 10, the two scale plates 9 can be held securely in spaced relation, while at the same time being correctly aligned each in its holding frame member 2.

The frame members 2 are also provided with a cutout 17 at each end in order to facilitate the grasping of the tongue 14. The two frame members 2 are each provided with guide grooves 18 on their two lengthwise portions 3 and 5, these grooves being bounded on one side by the scale plate 9 set in the frame member 2 (FIG. 5). The grooves 18 serve to guide a slider or runner 19 made of transparent synthetic resin material, such as the slider shown in FIG. 6. The slider 19 that, for example, may carry two markings 20, relating respectively to the scales 12 of the corresponding scale plate 9 and of the tongue 14, is formed with integral edge guiding portions 21 which are guided in the guide grooves 18 as shown in FIG. 5. In the region of one guiding portion an elastically movable tongue 22 is provided with a spring bias, so as to apply a pressure against the bottom of the adjoining guide groove 18 operating to prevent canting of the slider 19 when it is shifted along the length of the slide rule.

The assembly of a slide rule constituted according to the present invention is very simple.

First a slider 19 is set into each frame member 2 in such a way that its guiding portions 21 lie in the guide grooves 18. Then a scale plate, as already mentioned, is set into the guide groove 10 of its corresponding frame member 2 with the other side of the scale plate laid against the support shoulder 11, thus fixing the position of the scale plate in the transverse direction. Lengthwise shifting of the position of the scale plate 9 relative to the frame member 2 is prevented by a stop shoulder 23 (FIGS. 2 and 4). Then the two frame members with their sliders 19 and their scale plates 9, after one of the frame members is rotated so that its orientation is rotated 180° with respect to the orientation of the other, are brought into alignment and pressed together so that the tenon studs 4 and 8 engage or catch into the mortise cavities 6 and 7. Finally, the tongue 14 is inserted in the central guideway and the assembly is completed.

The two scale plates 9 are held in the respective frame members 2 completely fixed on all sides, as above described in the slide rule of the present invention, so that no use of adhesive or other additional affixation for the scale plates 9 is in any way necessary.

It is well known how the tenon studs 4 and 8 and the mortise cavities 6 and 7 can be shaped so that the qualities of the material will enable the two frame members to snap together into locked condition, and also how the studs may be provided with a central slotted portion to provide more elastic movement if the resilience of the material alone is not sufficient to provide a locking engagement, so that these matters are not further illustrated here.

As mentioned before, the windows 13 in the scale plates 9 may be transparent in the sense that they are apertures permitting the underlying scales of the tongue member to be seen through them, or they may be transparent because the material of the scale plate is transparent and there is no obscuring layer in the region of these windows.

It will also be understood that the expression "mortise and tenon" is used generally to refer to engagement of a projection and a matching cavity fixing the relative orientation of the parts and making for a firm joint holding a fixed relation between the parts.

Although the invention has been described with reference to a particular embodiment, it will be understood that variations are possible within the inventive concept.

I claim:
1. A slide rule, comprising:
   a slide rule tongue (14) provided with reference marks on both flat sides thereof;

a pair of fixed scale plates (9) provided with reference marks, said scale plates having transparent portions for viewing said tongue (14) therethrough;

at least one transparent slider (19) provided with at least one mark, and closed frame means (1) formed by two interfitting longitudinal members (2), for providing a guideway for said tongue (14), for holding said fixed scale members (9) by their longitudinal edges in respective positions separated by the tongue, and for providing a guideway (15) for each said slider for movement thereof exteriorly adjacent to one of said scale plates (9).

2. A slide rule as defined in claim 1 in which said two members (2) of said frame means (1) are identically shaped.

3. A slide rule as defined in claim 2 in which said two members (2) of said frame means (1) are shaped so as to interfit when one has an orientation shifted by rotation of 180° from the orientation of the other.

4. A slide rule as defined in claim 1 in which said interfitting members of said frame means (1) are constituted so as to interfit into lock relation with each other.

5. A slide rule as defined in claim 4 in which said members of said frame means (1) are shaped so as to interfit by mortise and tenon connections (4,8; 6,7).

6. A slide rule as defined in claim 5 in which at least some of the mortise (6) and tenon (4) elements are elongated in the longitudinal direction of said slide rule.

7. A slide rule as defined in claim 5 in which each of said frame means members is provided with mortise elements (6) in the neighborhood of one longitudinal edge (5) thereof and with correspondingly shaped tenon elements (4) in the neighborhood of the other longitudinal edge (3) thereof.

8. A slide rule as defined in claim 1 in which said guideway for said slider is provided by guide grooves (18) opening inward respectively located along each of the oppositely disposed longitudinal portions (3,5) of said frame means.

9. A slide rule as defined in claim 8 in which two separate sliders (19) are provided and slidably held in said guide grooves (18) for movement exteriorly adjacent to each of said scale plates respectively.

10. A slide rule as defined in claim 9 in which each slider (19) has guiding portions (20) at each end fitting in said guide grooves and is provided with spring bias means (22) in the neighborhood of at least one of said guiding portions (21) for supporting the slider away from the bottom of the adjacent guide groove (18).

11. A slide rule as defined in claim 8 in which said guide grooves (18) are bounded in each case on one side by a surface of one of said scale plates (9).

12. A slide rule as defined in claim 1 in which each scale plate (9) is held in one of said members (2) of said frame means (1) exactly in position, in both the longitudinal and transverse directions, by locking projections.

13. A slide rule as defined in claim 12 in which said scale plates (9) are held in position in said frame means (1) without the provision of an adhesive material.

* * * * *